United States Patent
Simmons et al.

(10) Patent No.: US 7,608,461 B1
(45) Date of Patent: Oct. 27, 2009

(54) SURFACE ENGINEERED NANOPARTICLES FOR IMPROVED SURFACE ENHANCED RAMAN SCATTERING APPLICATIONS AND METHOD FOR PREPARING SAME

(75) Inventors: Blake A. Simmons, San Francisco, CA (US); Albert Alec Talin, Livermore, CA (US)

(73) Assignee: Sandia Corporation, Livermore, CA (US)

( * ) Notice: Subject to any disclaimer, the term of this patent is extended or adjusted under 35 U.S.C. 154(b) by 812 days.

(21) Appl. No.: 11/228,934

(22) Filed: Sep. 16, 2005

(51) Int. Cl.
*B22F 9/24* (2006.01)
(52) U.S. Cl. .................. 436/166; 436/80; 75/362; 75/371; 977/777
(58) Field of Classification Search .......... 436/80, 436/164, 166, 525
See application file for complete search history.

(56) References Cited

U.S. PATENT DOCUMENTS

| | | | |
|---|---|---|---|
| 3,357,819 A | 12/1967 | Landsberg | 75/5 |
| 4,145,214 A | 3/1979 | Yoerger | 96/1 PC |
| 4,721,524 A | 1/1988 | Sheldon et al. | 75/0.05 A |
| 4,872,905 A | 10/1989 | Bourne et al. | 75/0.05 C |
| 5,514,202 A | 5/1996 | Lin et al. | 75/351 |
| 5,686,150 A | 11/1997 | Matsumoto | 427/558 |
| 6,149,868 A * | 11/2000 | Natan et al. | 422/82.05 |
| 6,177,103 B1 * | 1/2001 | Pace et al. | 424/489 |
| 6,348,431 B1 | 2/2002 | Even, Jr. | 502/325 |
| 6,579,721 B1 | 6/2003 | Natan et al. | 436/164 |
| 6,623,977 B1 | 9/2003 | Farquharson et al. | 436/164 |
| 6,770,488 B1 | 8/2004 | Carron et al. | 436/525 |
| 6,888,629 B1 | 5/2005 | Boss et al. | 356/301 |
| 2004/0232347 A1 | 11/2004 | Melekov et al. | 250/370.12 |
| 2004/0261907 A1* | 12/2004 | Hattori et al. | 148/121 |
| 2005/0196870 A1* | 9/2005 | Sun | 436/166 |

OTHER PUBLICATIONS

Moskovits. M.; "Surface-enhanced spectroscopy" *Reviews of Modern Physics*, 1985 v.57(3), pp. 783-829, Jul. 1985.

Jensen, T.R.; Malinsky, M.D.; Haynes, C.L.; and Van Duyne, R.P.; "Nanosphere Lithography; Tunable Localized Surface Plasmon Resonance Spectra of Silver Nanoparticles," *Journal of Physical Chemistry B*, 2000, v.104(45), pp. 10549-10556, Web published Oct. 21, 2000.

Simmons, B.A.; Sichu, L., John, V.T.; McPherson, G.L.; Bose, A.; Zhou, W.; and He, J; "Morphology of CdS Nanocrystals Synthesized in a Mixed Surfactant System," *Nano Letters*, 2002 v.2(4), pp. 263-268, Web published Mar. 7, 2002.

(Continued)

Primary Examiner—Robert J Hill, Jr.
Assistant Examiner—Dwan A Gerido
(74) Attorney, Agent, or Firm—Timothy P. Evans (57) ABSTRACT

A method for producing metal nanoparticles that when associated with an analyte material will generate an amplified SERS spectrum when the analyte material is illuminated by a light source and a spectrum is recorded. The method for preparing the metal nanoparticles comprises the steps of (i) forming a water-in-oil microemulsion comprising a bulk oil phase, a dilute water phase, and one or more surfactants, wherein the water phase comprises a transition metal ion; (ii) adding an aqueous solution comprising a mild reducing agent to the water-in-oil microemulsion; (iii) stirring the water-in-oil microemulsion and aqueous solution to initiate a reduction reaction resulting in the formation of a fine precipitate dispersed in the water-in-oil microemulsion; and (iv) separating the precipitate from the water-in-oil microemulsion.

6 Claims, 5 Drawing Sheets

OTHER PUBLICATIONS

Cortie, M.B.; van der Lingen, E.; "Catalytic Gold Nano-Particles" *Materials Forum*, 2002, v.26, pp. 1-14.

Boyen, H.-G.; Herzog, T.; Kastle, G.; Weigl, F.; Ziemann, P.; Spatz, J.P.; Moller, M.; Wahrenberg, R.; Garnier, M.G.; and Oelhfen, P.; "X-ray photoelectron spectroscopy study on gold nanoparticles supported on diamond," *Physical Review B*, 2002, v.65(7), pp. 075412-1-075412-5.

Goia, D.V.; "Preparation and formation mechanisms of uniform metallic Particles in homogenous solutions," *Journal of Materials Chemistry* 2004, v.14, pp. 451-458; Web published Jan. 12, 2004.

Koo, T.-W.; Chan, S.; Sun, L.; Su, X.; Zhang, J.; and Berlin, A.A.; "Specific Chemical Effects on Surface-Enhanced Raman Spectroscopy for Ultra-Sensitive Detection of Biological Molecules," *Journal of Applied Spectroscopy*, 2004, v58(12), pp. 1401-1407.

Su, X.; Zhang, J.; Sun, L.; Koo, T.-W.; Chan, S.; Sundararajan, N.; Yamakawa, M.; and Berlin, A.A.; "Composite Organic-Inorganic Nanoparticles (COINs) with Chemically Encoded Optical Signatures," *Nano Letters*, 2005, v.5(1), pp. 49-54, Web published Mar. 7, 2002.

\* cited by examiner

SURFACE ENGINEERED NANOPARTICLES FOR IMPROVED SURFACE ENHANCED RAMAN SCATTERING APPLICATIONS AND METHOD FOR PREPARING SAME

STATEMENT OF GOVERNMENT INTEREST

This invention was made with Government support under government contract DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

1. Field of the Invention

This invention relates generally to the preparation of nano-sized-sized metallic particles having a unique surface morphology which provide advantages for Surface Enhanced Raman Spectroscopy (hereinafter referred to as "SERS"). The present invention, therefore, also indirectly relates to the field of Raman spectroscopy, and more particularly, to a sensor for detecting and identifying chemicals and biological components using SERS.

More particularly, the present invention relates to a method for forming finely divided particles of gold with a discrete size and a unique shape. The method comprises: 1) forming a dilute solution comprising a soluble metal salt, water, and surfactants dispersed within a bulk oil phase to form a stable water-in-oil microemulsion, 2) forming a second solution comprising a reducing agent (hereinafter referred to as the "reductant"), water, oil, and the surfactants provided in the first solution; and 3) mixing the first and second solutions together thereby initiating a reduction reaction between the metal salt and the reductant and to form a nanoscale powder of the metal species.

The metal nanoparticles thus formed are useful as a signal-enhancing substrate for analyte detection using Raman spectroscopy, an emission technique that involves inelastic scattering of incident laser energy and results in spectral peaks that are frequency shifted from the incident energy. The Raman bands arise from changes in polarizability in a molecule during spectroscopic interrogation at specific light wavelengths that produce a vibrational mode of molecular translational energy. As a result, virtually all organic molecules display a characteristic Raman emission that corresponds to their inherent molecular structure. Therefore, a Raman sensor would not be limited to a specific class of molecules as is the case for the laser induced fluorescence (LIF) sensor. The inherently high resolution of Raman spectra often permits the analysis of several components in a mixture simultaneously.

Moreover, the Raman effect can be significantly enhanced by bringing the Raman-active molecule(s) close (<5 nanometers) to a nanometer-scale roughened metal surface. Bringing molecules in close proximity to metal surfaces is typically achieved through adsorption of the Raman-active molecule onto suitably roughened gold, silver, copper or some other metallic substrate. Surface-enhancement of the Raman activity is also observed with metal colloidal particles, metal films on dielectric substrates, and metal particle arrays. The mechanism by which this surface-enhanced Raman scattering (referred to hereinafter as "SERS") occurs is not well understood. It is thought to result from a combination of (i) electromagnetic effects known as surface plasmon resonances structures that occur at the metal-analyte interface and enhance the local intensity of the light, and (ii) chemical effects known as the formation and subsequent transitions of charge-transfer complexes between the metal surface and the Raman-active molecule.

SERS thereby allows for the enhanced detection and identification of molecules that are attached or brought into close proximity to the surface of a metal nanoparticle. A Raman-enhancing metal that is associated or bound to a Raman-active molecule(s) is referred to as a SERS-active nanoparticle. Such SERS-active nanoparticles can have utility as optical tags. For example, SERS-active nanoparticles can be used in immunoassays when conjugated to an antibody against a target molecule of interest. If the target molecule is immobilized on a solid support, then the interaction between a single target molecule and a SERS-active nanoparticle bound to an antibody can be detected by searching for the Raman spectrum unique to the Raman-active molecule. Furthermore, because a single Raman spectrum (having wavelengths from $100 \text{ cm}^{-1}$ to $3500 \text{ cm}^{-1}$) can detect many different Raman-active molecules, different SERS-active nanoparticles can be used in multiplexed assay formats.

The powders described herein also find utility as catalysts such as those used in electrochemical applications, including fuel cells and the like, automotive applications such as automotive catalytic converters, and other similar applications. The instant invention is particularly drawn to a method for forming small particles subsequently dispersed onto an inert support means such as finely divided ceramic particles or molecular sieves. Commonly known methods for loading catalyst particles onto such a catalyst support means include precipitation, adsorption, ion exchange, electrostatic adsorption, and physical impregnation through spray and/or dip coating.

2. Related Art

U.S. Pat. No. 6,770,488 discloses a colloidal system for detection of a variety of analytes involving techniques which permit reconstitution of a desiccated substance such as for surface enhanced Raman spectroscopic analysis and multiple sensors at once, each having different spectra through the use of markers or the like.

U.S. Pat. No. 6,348,431 discloses a process for producing fine, contamination-free, noble metal alloys ranging in size from about 5 nm to about 500 nm. The process comprises forming a solution of organometallic compounds by dissolving the compounds into a quantity of a compatible solvent, mixing a portion of each solution to provide a desired molarity ratio of ions in the mixed solution, rapidly quenching droplets of the mixed solution to initiate a solute-solvent phase separation as the solvent freezes, removing said liquid cryogen, collecting and freeze-drying the frozen droplets to produce a dry powder, and finally reducing the powder to a metal by flowing dry hydrogen over the powder while warming the powder to a temperature of about 150° C.

U.S. Pat. No. 5,686,150 discloses a process for depositing metals onto various substrates. In particular the patent teaches various salts of platinum, palladium and ruthenium deposited on substrates such as organic polymers, hybrid polymers and carbons. Said salts are then reduced by exposing the substrate with an energy source and then contacting the exposed substrate to a developer to permit reduction of the metal.

U.S. Pat. No. 5,514,202 discloses a method for producing fine alloy powders of silver and palladium at temperatures at or below 50° C. The method comprises forming solutions of the metal nitrates, mixing them, and then adding a neutralizing and complexing agent to the mixed solution to adjust the solution pH to between 2.5 and 3.5. This resultant solution comprises silver and palladium ions. A solution comprising a reducing agent is then prepared and brought into contact with the mixed solution while stirring the solutions and maintaining the solution temperature between 15° C. and 50° C. in order to allow the silver and palladium ions to be reduced and to co-precipitate and form silver-palladium alloy particles.

U.S. Pat. No. 4,721,524 teaches a method for producing a non-pyrophoric submicron alloy powder of Group VIII metals. An aqueous chemical process involving spontaneous nucleation is employed in the manufacture of the alloy product. One such product is prepared with isomorphic compounds of nickel and palladium. In the preferred form, small concentrations of palladium and/or platinum ions are added to ionic nickel and/or cobalt solutions. A hot solution of the metal ions of nickel and/or cobalt and palladium and/or platinum is mixed with hydrazine in a hot basic aqueous solution and rapidly diluted with hot water. The precipitate formed is filtered, sequentially chemically washed, and dried. The dried alloy product is a black, non-pyrophoric, magnetic powder. Examination by electron probe and X-ray diffraction shows the alloy product to be a solid solution of the constituent metals.

U.S. Pat. No. 4,145,214 discloses a photo-conductor composition prepared by a co-crystallization technique. In particular, this invention teaches that the photo-conductor can be formed by co-crystallization of the two components (p-terphenyl and p-quaterphenyl) from solutions in a common solvent. Typically the co-crystalline material is precipitated, for example, by subsequent evaporation of the solvent.

U.S. Pat. No. 3,357,819 discloses a process for preparing homogenous powders composed of ultra-fine particles. A solution or dispersion of a salt is freeze dried by dripping into a cold solution such as liquid nitrogen, followed by sublimation of the water from the particles. The patent does not refer to any pre-process method for controlling the shapes of the particles so generated.

Many other examples exist of alloy formation by similar solution-precipitation processes but, as will be shown, none exhibit the essential characteristics of the instant invention.

SUMMARY

It has been discovered that nanoparticles of certain gold compounds can be synthesized at room temperature in a water-oil-surfactant mesophase to yield a metal particles.

It was further discovered that these particles possess a unique truncated morphology, broadly characterized as a stellated icosahedron.

It was also discovered that these particles possess unique spectroscopic characteristics.

Embodiments of the present invention, therefore, comprise metal nanoparticles having a unique truncated morphology broadly characterized as a stellated icosahedra and a process for making such particles at temperatures at or near room temperature.

An object of this invention, therefore, is to provide a free-flowing metal powder broadly characterized as a stellated icosahedra morphology wherein the metal is a SERS-active metal.

Another object of this invention is to provide a process for preparing nanoscale metal particles by first forming an aqueous solution of a metal salt, adding an oil phase and surfactants to form a reverse micelle water-in-oil microemulsion, and then adding a mild reductant.

Yet another object of this invention is to provide a low temperature method for producing a catalyst in situ, the catalyst comprising a metal or metal alloy uniformly dispersed onto an inert support structure.

To achieve these and other objects, there is provided a method for producing SERS-active metal powders at room temperature. It should be noted, however, that the instant invention is not limited solely to the metal compounds disclosed herein but is applicable to any metal or combination of metals. Moreover, these and other objects, advantages, and features of the invention will become apparent to those having skill in the art after a reading the following description of the various embodiments when considered with the drawings and appended claims.

DETAILED DESCRIPTION OF THE PREFERRED EMBODIMENTS

Figure 1A:
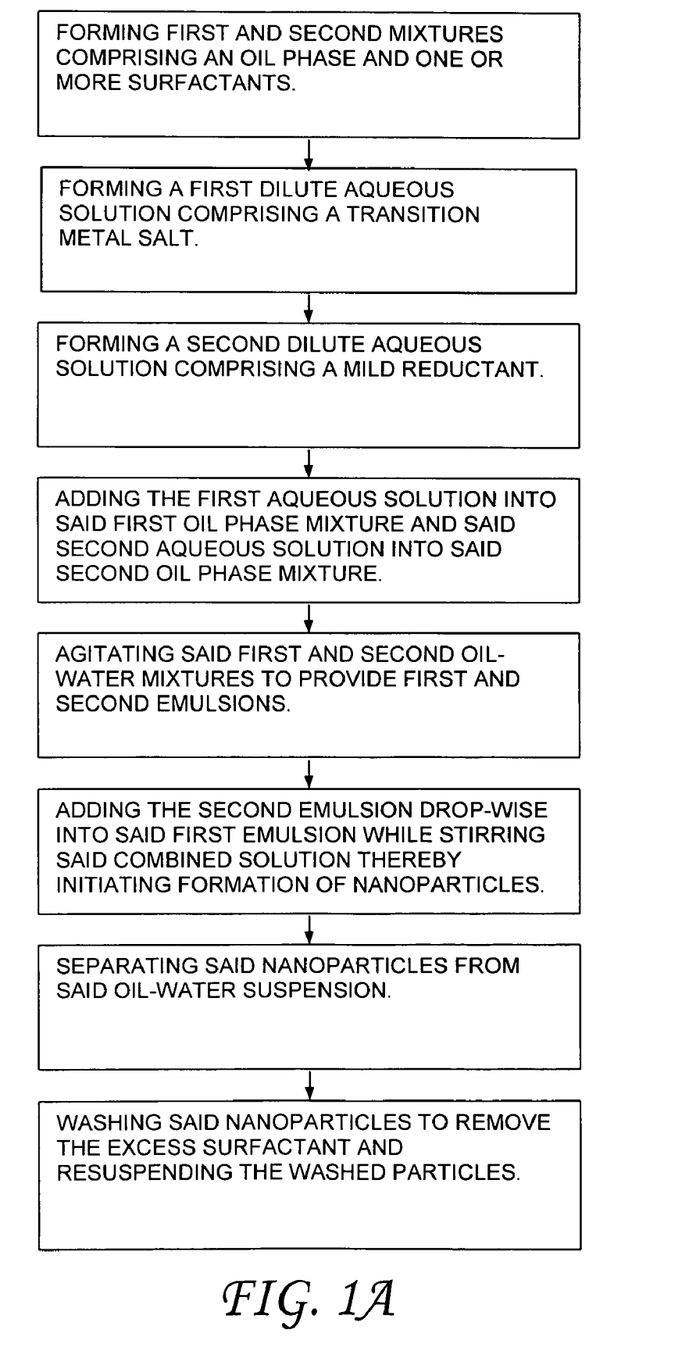
FIG. 1A schematically illustrates the disclosed process of the instant invention as a block flow diagram.
Figure 1B:
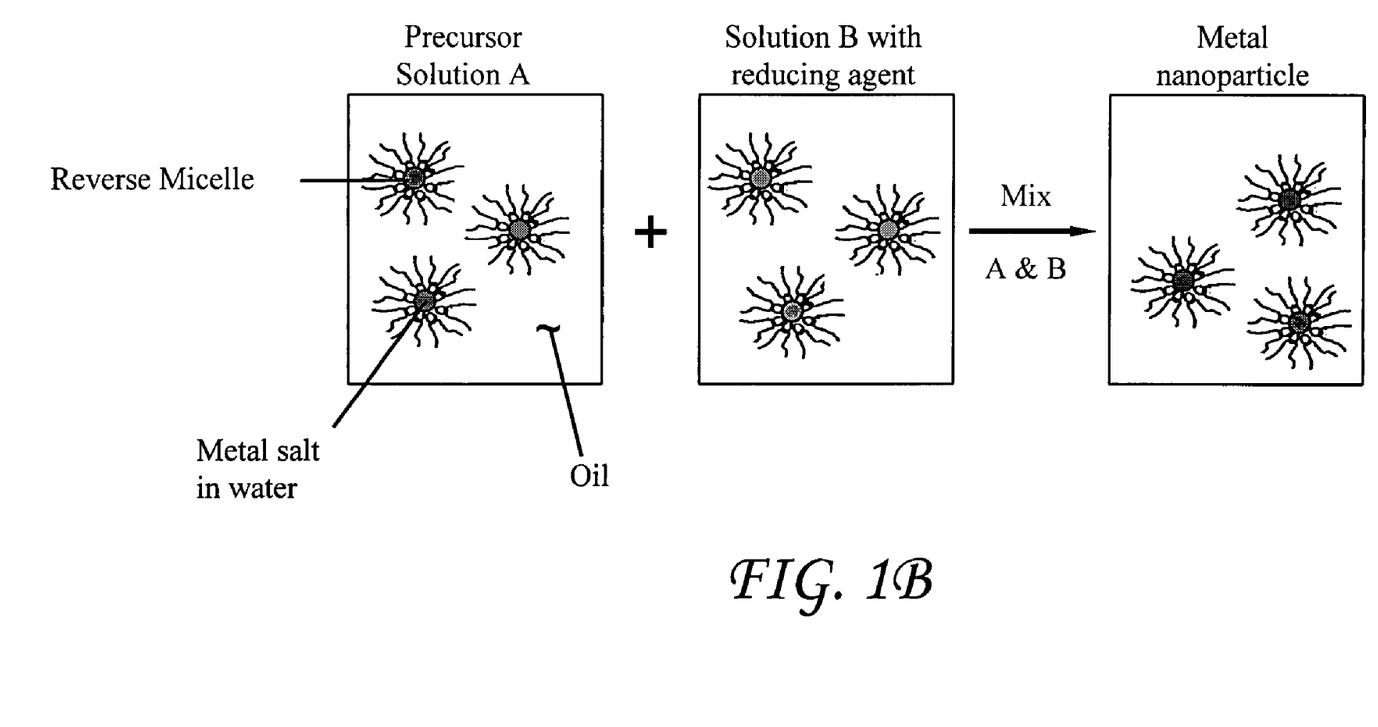
FIG. 1B is a cartoon depiction of the synthetic procedure for forming nanoparticles.

While the applicant does not wish to be tied to any particular theory as to the operability of the invention, it is believed the morphology and electronic behavior of the metal particles recited in the following embodiments are controlled by following process described below. A schematic diagram of the instant process is shown in FIG. 1.

An embodiment of the present invention is drawn to a process for providing fine particles of a transition metal that possess unique surface morphologies ideally suited for SERS and other catalytic functions. The general method comprises preparing an aqueous solution of a transition metal salt compound; preparing an aqueous solution of a mild reductant compound; and then forming an oil-water emulsion.

The bulk phase and surfactants were first combined and the mixture agitated and separated into two identical quantities of the mixed solution. Aliquots of the two water solutions were then separately introduced into one or the other of the two quantities of the bulk oil phase. Each of these two solutions was separately agitated to incorporate the water phase into the oil phase and thereby form separate isotropic transparent microemulsions. Agitation was typically performed by sonication but other forms of mixing including mechanically assisted shaking (with or without a stirring element) and use or high-shear blending equipment are also possible.

Following formation of the two water-in-oil microemulsions, the mixture comprising the reductant was slowly introduced and incorporated into the mixture comprising the transition metal salt compound and stirred. The addition of the reductant caused the formation of the metal nanoparticles.

This solution was then placed in a centrifuge and spun in order to separate the newly formed particles from the water-in-oil microemulsion. After separation, the excess liquid, or supernate, was decanted leaving the metal particles behind. These were then washed several times in methanol to remove as much of the residual surfactant as possible.

EXAMPLES

Best Mode

In order to provide the nanoparticles of this embodiment, two separate solutions (hereinafter solutions "A" and "B") were prepared comprising a bulk oil phase and a pair of surfactants to facilitate the eventual formation of a stable water-in-oil microemulsion. The bulk oil phase could be any non-polar alkane, where C is 7 or greater; styrene; toluene; or chloroform; or equivalent polymers that are a room temperature liquid but the particular bulk phase used herein was 2,2,4 trimethylpentane (also known as "isooctane"). The particular surfactants used herein were sodium bis(2-ethylhexyl) sulfosuccinate (also known dioctyl sulfosuccinate, aerosol-OT or "AOT"), and phosphatidylcholine (hereinafter referred to as "PTC") and were each provided at a concentration equal to 0.2 M with the former of the two surfactants being added first to each of solutions A and B. Each of solutions A and B were sonicated for several minutes to thoroughly incorporate the surfactants in the bulk phase and providing isotropic, clear, yellow solutions.

Following preparation of the two oil solutions, a 20 mM aqueous solution of the gold salt ($AuCl_4$, available from Sigma-Aldrich, Milwaukee, Wis.), and a 0.1 mM aqueous solution of a mild reductant compound were prepared. While ascorbic acid was used herein, other reductants such as urea, hypophosphite, dimethylamine borane (DMAB), sulfur dioxide and β-mercaptoethanol are thought to be effective. More aggressive reducing agents such as sodium borohydride or hydrazine, however, are believed to act too quickly and prevent the formation of the specific particle morphology discovered by the Applicants.

A 40 μL aliquot sample was then drawn from each of the aqueous solutions, and the sample containing the gold salt solution introduced into solution A and the sample containing the reductant solution introduced into solution B. Each of solutions A and B were again sonicated for several minutes to incorporate the water phase into the bulk phase and to provide thereby a stable water-in-oil microemulsion. Finally, a magnetic stir bar was added to solution A, stirring initiated, and the entire contents of solution B drop-wise introduced into solution A by pipette. This mixed solution was then allowed to react for between 3 and 24 hours. In all cases, solution A was found to begin to exhibit a pale blue tint immediately after the introduction of solution B carrying the reductant. Applicants are uncertain as to why the solution was expressed with a bluish tint since the color normally associated with gold nanoparticles is red. However, this color was seen to persist even when the gold particles were re-dispersed in a variety of different solvent media, including isooctane, water and ethanol. UV-Visible light spectra taken of the sample in water indicated an absorption feature that is accordingly shifted when compared to 80 nm gold particles.

After the reaction had proceeded to completion (typically within about 3 hours), the nanoparticles were recovered by placing the mixed solution into one or more standard conical bottom 15 ml centrifuge tubes and placing the filled tubes into a bench top centrifuge (Fisher accuSpin Model 1, available from Fisher Laboratory Equipment Division, Pittsburgh, Pa.) and spinning them at 5000 rpm for 20 minutes. Following the concentration step, the liquid supernate is poured off, the particles re-suspended in methanol/ethanol in order to remove any excess surfactant, and replaced in the centrifuge to be re-concentrated, again by spinning them at 5000 rpm for 20 minutes. This washing step is repeated twice more after which the nanoparticles are re-suspended in deionized water for further evaluation. It was found that re-suspending the particles greatly facilitated handling/manipulating them. The re-suspended solution was found to retain a clear pale blue coloration.

Figure 2:
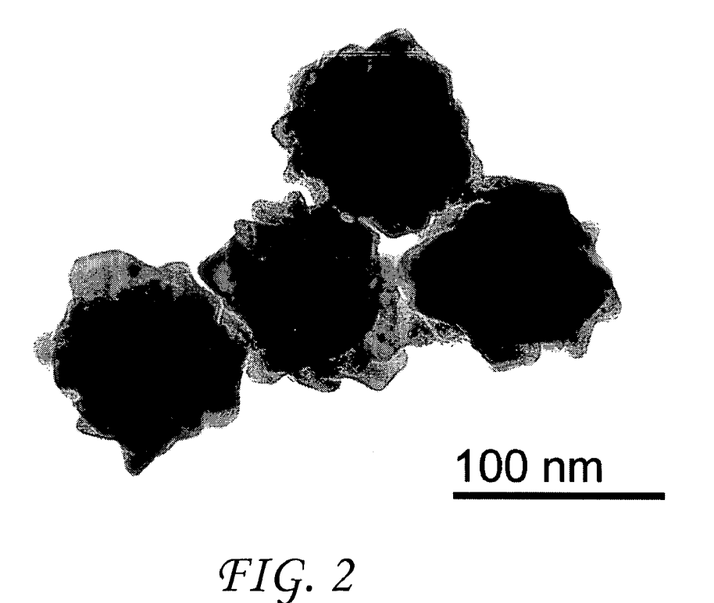
FIG. 2 shows a transmission electron microscope (hereinafter "TEM") photomicrograph of several particles of the gold nanoparticles prepared as described herein.
Figure 3:
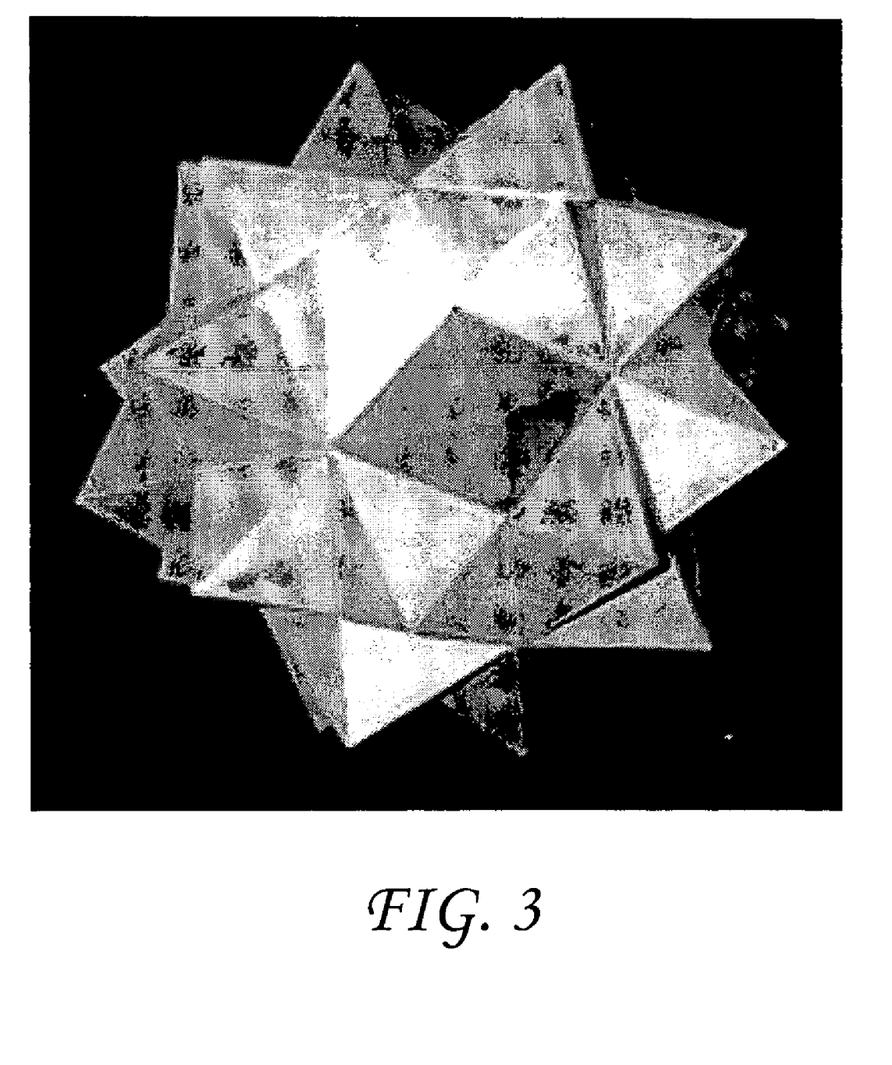
FIG. 3 shows an image of a stellated polyhedra known as an octahedron 5-compound structure.
Figure 4:
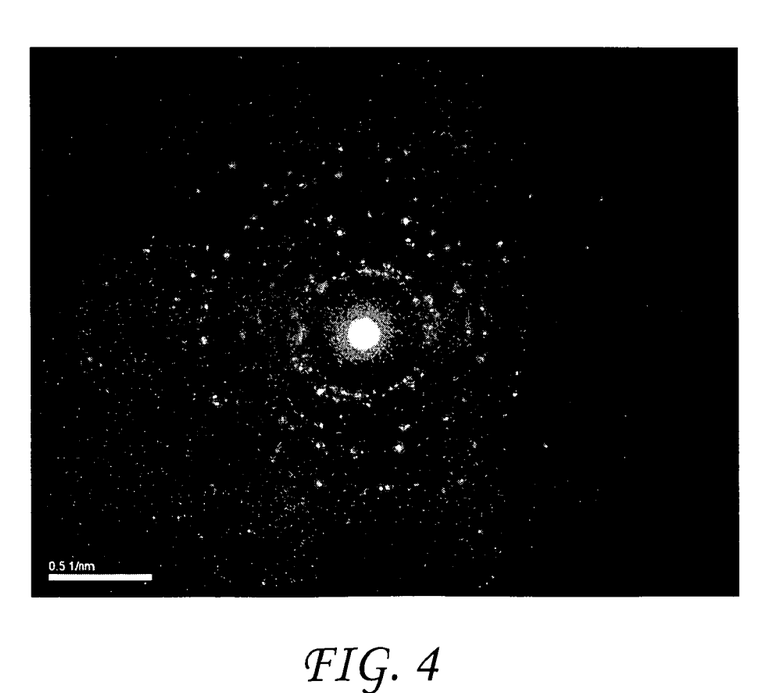
FIG. 4 shows a TEM energy dispersive X-ray analysis (hereinafter "EDX") spectra of the gold particles strongly suggesting the particles are polycrystalline.
Figure 5:
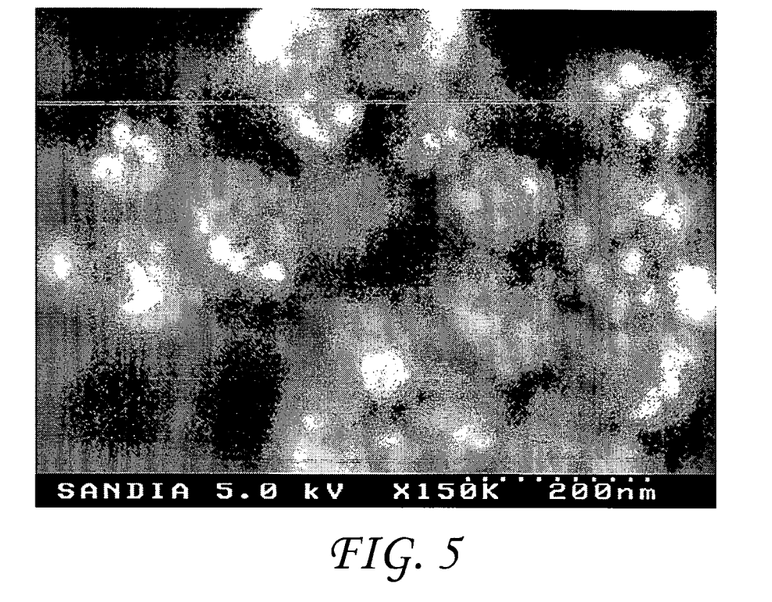
FIG. 5 shows a photomicrograph of a number of clusters of the gold particles prepared as described herein.
Figure 6:
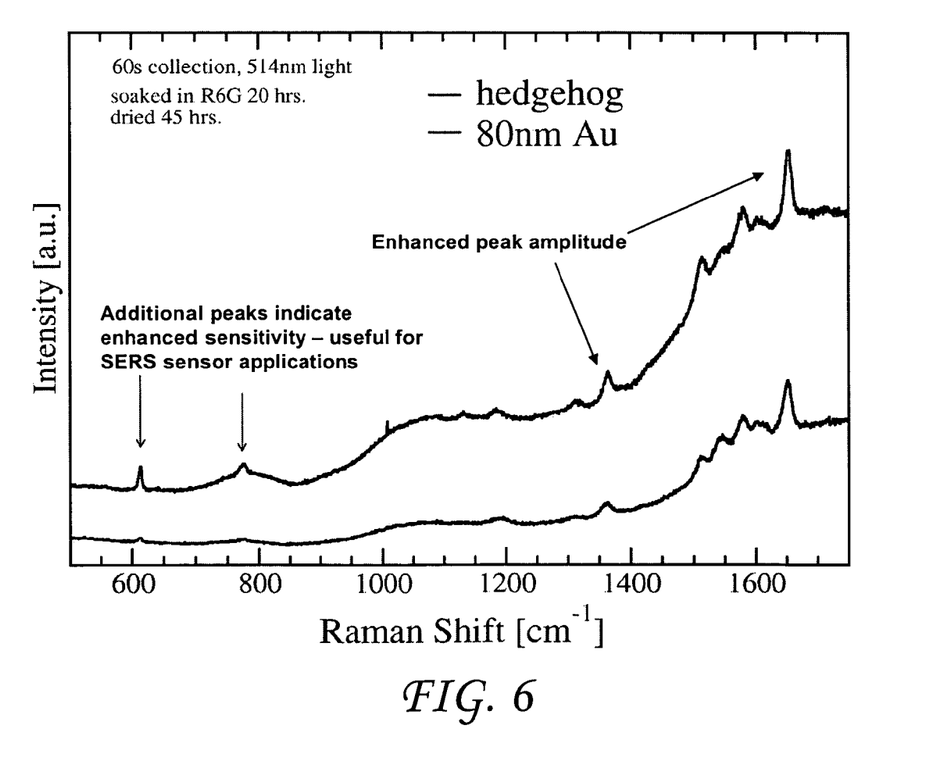
FIG. 6 shows the observed Raman enhancement provided by associating a sample of rhodamine 6G dye with the gold nanoparticles prepared as described herein as compared with associating the dye sample with prior art 80 nm gold colloid particles.

Following recovery of the nanoparticles of this embodiment, the product was characterized using SEM, TEM, and EDX. The nanoparticles were found to exhibit an unusual surface morphology. Sample TEM images are presented in FIG. 2. The particles are seen as having a roughly spherical shape, but possessing a number of spaced apart protrusions or "knobs" across their entire surface. The particles provided by this method, therefore, are generally "burr" shaped, loosely representative of stellated polyhedra such as the octahedron 5-compound structure shown in FIG. 3 which the Applicants have chosen to refer to the particles as "nanostars." Because of this shape, the nanostar particles have a significantly greater surface area than prior art nanoparticles, which are typically characterized as having very smooth and/or porous surfaces. The EDX results, shown in FIG. 4, indicate that the nanoparticles are highly polycrystalline and may exhibit twinned structures.

The observation of the increased surface area of this material lead the Applicants to believe that the particles might act as a functional media for surface enhanced Raman scattering. In order to test this hypothesis two tinctured solutions were made. One of the solutions was prepared with the new materials nanostar particles and a second solution prepared with commercially available 80 nm diameter colloidal gold particles. 2 mL of each of these solutions was then dispensed onto a silicon wafer and the suspension media allowed to evaporate. The nanoparticles were then soaked in a solution of Rhodamine 6G (a dye used for SERS measurements available from several commercial vendors including Sigma-Aldrich) and dried for 24 hours. The particle-dye complex was then probed with a micro-Raman spectrometer to determine if these materials possess any advantages over comparably sized Au colloids with smooth surfaces. The results, shown in FIG. 4, indicate that these nanoparticles do indeed amplify the Raman spectrum of the Rhodamine dye and thereby confirm the SERS characteristics of the nanoparticles. This result, therefore, provides evidence that the surface engineered nanoparticles of the present embodiment have several unique properties that make them ideal candidates for nanoscale sensors, high surface area catalysts, and electronic devices.

Finally, to the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art would realize that the disclosures herein are exemplary only and that various other alternatives, adaptations, and modifications may be made within the scope of the present invention. Accordingly, the present invention is not limited to the specific embodiments as illustrated herein, but is only limited by the following claims. In particular, submicron-sized gold particles are known to be effective catalysts. Therefore, another embodiment of this invention is a catalyst once the gold particles are dispersed and mounted on a substrate such as an inert, porous powder such as activated carbon, aluminum oxide or barium carbonate, molecular sieves such as zeolites by precipitation, impregnation, or adsorption. As before, a solution comprising preparing solutions of metal compounds in a suitably common solvent is disclosed. These solutions A and B are mixed, sonicated, and allowed to react. After an appropriate time, a quantity of the catalyst substrate is added and the micro-emulsion again sonicated in order to disperse the substrate into the micelles and allowed to contact the gold nanoparticles. Finally, the micro-emulsion is processed in ethanol in order to recover the particulate matter.

What is claimed is:

1. A method for preparing SERS gold nanoparticles, the method comprising the steps of:
    (a) forming a first emulsion comprising:
        (i) forming a first oil phase mixture comprising a bulk oil phase and a surfactant mixture comprising sodium bis(2-ethylhexyl) sulfosuccinate (AOT) and phosphatidylcholine (PTC);
        (ii) forming a first dilute aqueous solution consisting essentially of water and a gold salt;
        (iii) adding the first dilute aqueous solution into the first oil phase mixture; and
        (iv) agitating the first oil phase mixture to provide the first emulsion;
    (b) forming a second emulsion comprising:
        (i) forming a second oil phase mixture comprising a bulk oil phase and a surfactant mixture comprising AOT and PTC;
        (ii) forming a second dilute aqueous solution comprising a reducing agent selected from the group consisting of reducing agent selected from the group of ascorbic acid, urea, dimethylamine borane (DMAB), sulfur dioxide or β-mercaptoethanol;
        (iii) adding the second dilute aqueous solution into the second oil phase mixture; and
        (iv) agitating the second oil phase mixture to provide the second emulsion;
    (c) adding the second emulsion to the first emulsion to provide an emulsion mixture;
    (d) stirring the emulsion mixture to initiate a reduction reaction between the reducing agent and the gold salt solution to provide a precipitate dispersed in the emulsion mixture; and
    (e) separating the precipitate from the emulsion mixture, thereby providing a plurality of gold nanoparticles, wherein the gold nanoparticles comprise a nanometer scale roughened surface structure.

2. The method of claim 1, wherein the step of forming the first oil phase mixture further comprises the steps of adding and mixing the AOT before adding and mixing the PTC.

3. The method of claim 1, wherein the step of forming the second oil phase mixture further comprises the steps of adding and mixing the AOT before adding and mixing the PTC.

4. The method of claim 1, wherein the step of adding the second emulsion to the first emulsion further comprises the step of dispensing the second emulsion drop-wise into the first emulsion while stirring the first emulsion.

5. The method of claim 1, wherein the step of separating the precipitate from the emulsion mixture further comprises the steps of:
    (a) pouring the emulsion into one or more containers;
    (b) spinning the containers in a centrifuge for a period of time sufficient to concentrate the precipitate in one end of each of the one or more containers;
    (c) decanting the supernate liquid; and
    (d) washing the concentrated precipitate by re-suspending the precipitate in a quantity of solvent media;
    (e) repeating steps (b) through (d) at least twice; and
    (f) re-suspending the washed precipitate in a final quantity of solvent media.

6. Metal nanoparticles made by the process of claim 1, wherein the roughened surface structures of the metal nanoparticles comprise a plurality of protruding knobs distributed roughly uniformly across a generally spheroidal body.

* * * * *